US009300681B2

(12) United States Patent
Haddad et al.

(10) Patent No.: US 9,300,681 B2
(45) Date of Patent: Mar. 29, 2016

(54) METHOD FOR PREFIX REACHABILITY IN A COMMUNICATION SYSTEM (71) Applicant: TELEFONAKTIEBOLAGET L M ERICSSON (PUBL), Stockholm (SE)

(72) Inventors: Wassim Haddad, San Jose, CA (US); Mats Näslund, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/477,333

(22) Filed: Sep. 4, 2014

(65) Prior Publication Data

US 2015/0047041 A1  Feb. 12, 2015

Related U.S. Application Data (63) Continuation of application No. 12/531,659, filed as application No. PCT/SE2008/050209 on Feb. 26, 2008, now Pat. No. 8,863,236.

(60) Provisional application No. 60/895,178, filed on Mar. 16, 2007.

(51) Int. Cl.
*H04L 29/06* (2006.01)
*H04L 9/30* (2006.01)

(52) U.S. Cl.
CPC ............ *H04L 63/1416* (2013.01); *H04L 9/30* (2013.01); *H04L 63/061* (2013.01); *H04L 63/123* (2013.01); *H04L 63/1466* (2013.01); *H04L 2209/24* (2013.01)

(58) Field of Classification Search
CPC ........... H04L 9/00; H04L 29/00; H04L 43/00; H04L 45/00; H04L 63/00; G06F 17/00; G06F 21/00
See application file for complete search history.

(56) References Cited

U.S. PATENT DOCUMENTS 7,760,744 B1    7/2010  Mohaban
2006/0171331 A1  8/2006  Previdi (Continued)

OTHER PUBLICATIONS

J. Wu et al: 'Source Address Validation Architecture (SAVA) Framework', draft-wu-sava-framework-00.txt, Feb. 7, 2007, p. 1-16, http://tools.ietf.org/html/draft-wu-sava-framework-00, section 6.1.

(Continued)

*Primary Examiner* — Joseph P Hirl
*Assistant Examiner* — Leynna Truvan (57) ABSTRACT A method, arrangement, and first access router in a packet-switched communication network for determining that a first endpoint originating a communication session with a second endpoint is not initiating a malicious man-in-the-middle attack. The first access router provides access for the first endpoint to the network and a second access router provides access for the second endpoint. The first and second access routers facilitate conducting a secure key exchange between the first and second endpoints, wherein a shared secret key is generated. The first access router utilizes a Prefix Reachability Detection (PRD) protocol to determine the first endpoint is topologically legitimate due to being topologically located behind the first access router, and then sends a Prefix Request Test Initialization (PRTI) message to the second access router indicating the first endpoint is topologically legitimate.

9 Claims, 4 Drawing Sheets

(56) References Cited

U.S. PATENT DOCUMENTS

2009/0201855 A1* 8/2009 Weniger et al. ............... 370/328
2010/0296481 A1* 11/2010 Weniger et al. ............... 370/331

OTHER PUBLICATIONS

W. Haddad et al: "Enabling Source Address Verification via Prefix Reachability Detection", draft-haddad-sava-prefix-reachability-detection-00, Jul. 1, 2007, p. 1-14; http://ftp.ist.utl.pt/pub/drafts/draft-haddad-sava-prefix-reachability-detection-00.txt, whole document.

J. Wu et al: Source Address Verification Architecture Problem Statement, ity Detection, draft-sava-problem-statement-00, Feb. 5, 2007, http://tools.ietf.org/id/draft-sava-problem-statement-00.txttp.ist.utl.pt/pub/drafts/draft-haddad-sav-prefix-reachability-detection-00.txt, pp. 1-9.

\* cited by examiner

METHOD FOR PREFIX REACHABILITY IN A COMMUNICATION SYSTEM

CROSS-REFERENCE TO RELATED APPLICATIONS AND CLAIM OF PRIORITY

This application is a continuation of co-pending U.S. patent application Ser. No. 12/531,659 filed Sep. 16, 2009, which is a 371 of International Application No. PCT/SE08/50209, filed Feb. 26, 2008, which claimed the benefit of U.S. Provisional Patent Application No. 60/895,178, filed Mar. 16, 2007, the disclosures of which are fully incorporated herein by reference.

TECHNICAL FIELD

The present invention is directed, in general, to security in data communications and, more specifically, to a messaging scheme for verifying aspects of the relevant network topology to provide a higher degree of confidence that no false-location (for example man-in-the middle) attack on a communication session is being attempted.

BACKGROUND

Data communications, and other types of communications as well, are conducted over various types of networks that allow one party to transmit, for example, data, voice, and streaming multimedia presentations to one or more other parties during a communication session. A standard telephone network, for example, is a switched network where a communication circuit between the two (or more) parties is established by a series of links that are connected by switching mechanisms. In this type of network, it is possible to monitor the status of each switch and link in the communication circuit to know which are involved in the communication session in question. Absent some problem, the circuit is usually created for the duration of the sessions, and the various links and switches involved are released when the session is terminated.

Figure 1:
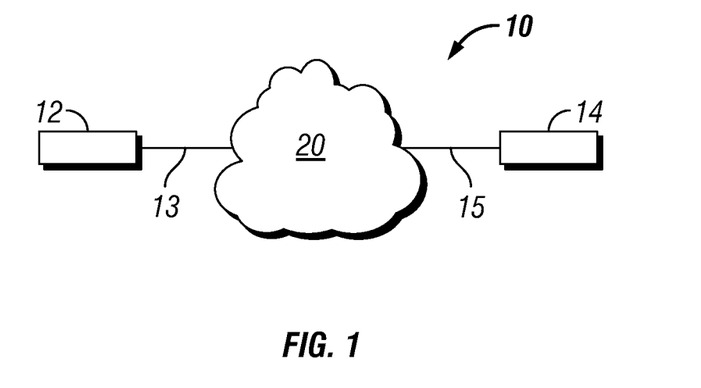
FIG. 1 is a simplified block diagram illustrating a communication system that includes a packet-switching network.

In another type of network, which operates somewhat differently, a packet-switching technology may be used. FIG. 1 is a simplified block diagram illustrating a communication system 10 that includes a packet-switching network 20. Communication system 10 includes a first node 12 and a second node 14. There are usually a great many such nodes, of course, but these will serve for the purpose of illustration. These nodes may be, for example, personal computers, mobile telephones, or similar devices that may communicate with each other via the packet-switching network 20. Lines 13 and 15 represent the communication channel or channels that are used by the nodes to send and receive information. These channels may be, for example, telephone lines, dedicated cables, or radio channels. The packet-switching network 20 may be the Internet or a similar network. The network is frequently represented as a cloud in illustrations because it is actually composed of a myriad of switches, routers, other nodes that form the vast network though which packets may be routed.

According to this networking scheme, information is represented in digital form and separated into many small information-bearing units called packets. Each packet bears the address of its destination. Packets are sent through the network of components, toward their final destination, but not every packet will take the same route. They do not necessarily arrive in order, and therefore also bear identification and sequencing information so that the transmitted data may be reassembled in its original form. Lookup tables are distributed so that each responsible node is able to route received packets toward their destination.

A set of rules or standards that exist for packet-switching networks is usually referred to as a protocol; the Internet uses one referred to simply as the Internet protocol (IP—or IPv6 to indicate, for example, version 6 of the Internet protocol). The network protocol governs how, among many things, packets are assembled and routed, how errors are corrected, and how the individual network components should communicate with each other.

Some provisions are included for confidential communications, for example through the use of encryption keys. When two (or more) nodes, such as node 12 and node 14 shown in FIG. 1, establish a communication session, they are able to exchange keys in a sequence of messages and generate a shared secret encryption key ($K_S$). Any node that does not possess $K_S$ will not be able to decrypt the transmissions between the end nodes 12 and 14. One protocol that governs such a procedure is referred to as IKEv2 (Internet key exchange version 2), although others have been promulgated as well. An ART (address reachability test) is often performed in conjunction with the key exchange so that each end node gains some assurance about the topological location of the other end node.

Figure 2:
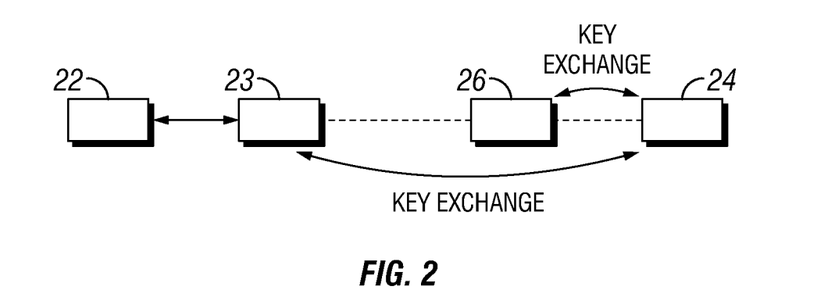
FIG. 2 is a simplified block diagram illustrating the problem introduced by a man-in-the-middle false-location attack.

Although use of a shared secret key provides a good deal of transmission security, it leaves the communication session vulnerable to some false-location attacks (for example the so-called man-in-the-middle attack). FIG. 2 is a simplified block diagram illustrating the problem introduced by such an attack. In this example, end node 24, which is perhaps a server of some kind, receives a notification that a client wishes to establish a communication session. The client purports to be end node 22, which accesses the communication network via access router 23. A key exchange will ensue so that encrypted information may be transmitted back and forth between the two end nodes. What end node (server) 24 has no way of knowing, however, is whether it is actually conducting the key exchange with a node 26 that has interposed itself along the path between end node 24 and access router 23. If node 26 involves itself in the key exchange process, it will be able to intercept and decrypt communications, selectively passing on whatever information it wants to end nodes 22 and 24, who will be unaware that this is occurring. Neither the key exchange itself nor the ART will typically detect this type of attack.

SUMMARY

To address the above-discussed deficiencies of the prior art, it is a primary object of the present invention to provide a method and system for providing a higher degree of confidence to end nodes in a communication system, or to the access devices that couple them to the network, that a false-location attack is not being attempted prior to or during a communication session.

There is therefore a need in the art for a method for enhanced network security that addresses fraud, such as the so-called man-in-the-middle attack, and preferably is capable of authenticating a host, and verifying its presence on a path between a verifier node and a verified node, especially one that can verify the host's presence on a specific link. The present invention provides just such a solution.

In one aspect, the present invention is a method for establishing a communication session between two endpoints in a communication system. The endpoints of the system are operable to selectively communicate with each other via a packet-switching network during a communication session. Before the communication session is established, however, a PRD (Prefix Reachability Detection) protocol is initiated. The PRD is preferably initiated upon detecting a request to open the session. The request may be detected at a first endpoint, or at an access device through which the first endpoint accesses the network. Once the PRD protocol has been initiated, the first access device sends a message to a second access point, which is purportedly providing network access to a second endpoint that is requesting the communication session. The message challenges the location of the requesting second endpoint. The second access device then determines whether the second endpoint is topologically located behind the second access device, and notifies the first access device of the results of the determination. In a preferred embodiment, either the endpoints themselves, or their respective access devices, initially perform a key exchange that includes an ART (address reachability test). The PRD may be performed after the key exchange, or more or less in parallel with it. Where a shared secret key $K_S$ has been generated, it, or the output of a hash algorithm using $K_S$, may be used for proving the authenticity of some or all of the messages exchanged pursuant to the PRD protocol.

In another aspect, the present invention is a communication system having a first end node and a second end node. The nodes are operable to communicate with each other via a network, for example a packet switching network such as the Internet. The first end node accesses the network through a first access router and the second end node accesses the network through a second access router. According to this aspect of the present invention, the first end node is arranged to receive a request to establish a communication session with the second end node and to initiate a PRD to confirm the location of the second end node. The first access router is arranged to, upon initiation of the PRD by the first end node, send a location challenge to the second access router, to receive a response indicative of the location of the second end node, and to notify the first end node according to the indication in the response. Also according to this aspect, the second access router is arranged to receive the location challenge from the first access router, to determine the topological location of the second end node relative to the communication path between the first access router and the second access router, and to send a response to the first access router indicative of the legitimacy of the second end node.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 3 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged communication system.

The present invention is directed to a method, and to a system for implementing the method, of evaluating the topology of a proposed communication path between a node requesting a communication session and the node being requested. The topology is evaluated in an attempt to confirm, or at least to give greater assurance, that the requesting node is legitimately the entity it purports to be, and not an interloping host attempting a false-location type of attack. Depending on the results of the evaluation, the communication session may (or may not) be allowed to continue.

Figure 3:
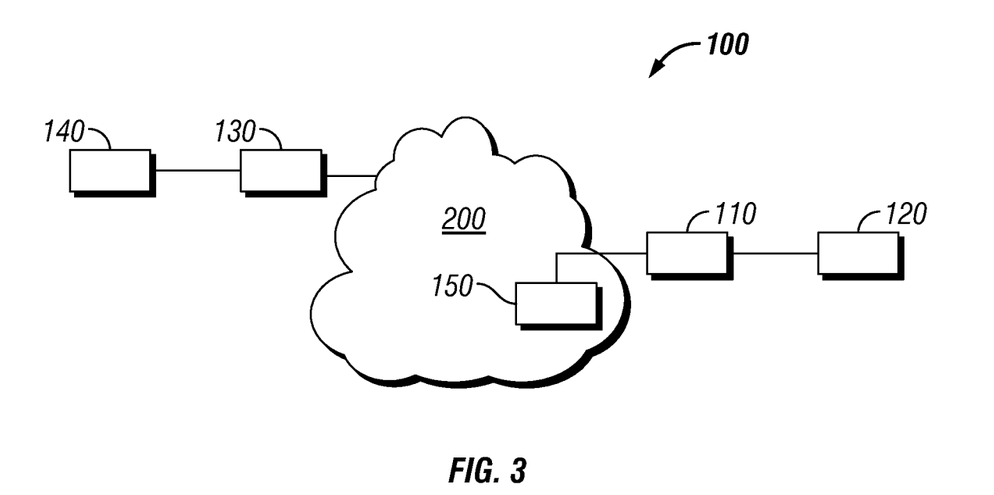
FIG. 3 is a simplified block diagram illustrating a communication system arranged for performing a PRD (Prefix Reachability Detection) protocol according to an embodiment of the present invention.

FIG. 3 is a simplified block diagram illustrating a communication system 100 arranged for performing the PRD (Prefix Reachability Detection) protocol according to an embodiment of the present invention. The PRD protocol, otherwise referred to as "location authentication", may be performed when a communication session is established, and may also be repeated one or more times once the communication session is underway. In this embodiment, first endpoint 120 and second endpoint ("endpoint" is herein used interchangeably with "end node") are arranged to communicate with each other via the packet-switching network 200. Packet-switching network 200 is, in this embodiment, the Internet, and communication sessions are established and held under IPv6 (Internet protocol, version 6). In other embodiments the packet-switching network may be any network that uses similar packet-routing techniques to convey information.

In the embodiment of FIG. 3, first endpoint 120 and second endpoint 140 communicate with the packet switching network 200 through access router 110 and access router 130, respectively. The endpoints could be respectively a server and a client, or they could be peer devices; in either case they could be fixed or mobile. The term "endpoint" (or end node) will be deemed to encompass them, and similar devices operable to communicate via a packet-switching network in similar fashion. Each of access routers 110 and 130 are arranged to contact DNS (domain name system) servers to obtain address and routing information. As an example, in FIG. 3, DNS server 150 is shown in communication with first access router 110 (although this does not imply that they are directly connected, or that there is only one DNS server accessible to the first endpoint 120).

In this embodiment, the first endpoint 120 is arranged to receive a request to establish a communication session with the second endpoint 140, and also to initiate a PRD to confirm the legitimacy of the second endpoint 140. The first access router 110 is arranged to, upon initiation of the PRD by the first endpoint 120, send a location-authentication challenge to the second access router 130. The second access router 130 is operable to make a determination, upon receipt of a location-authentication challenge, as to the topological location of the second endpoint 140, that is, whether it is actually located behind the second access router 130. When this determination has been made, preferably by exchanging an NDP (neighbor discovery protocol) message and response with the second endpoint 140, a notification is sent to the first endpoint 120. The notification contains an indication of whether the second endpoint is legitimate or might be part of an attempted man-in-the middle or other type of false-location attack. Public keys and a hashed shared secret key generated during a key exchange may be used for authentication of the messages.

Figure 4:
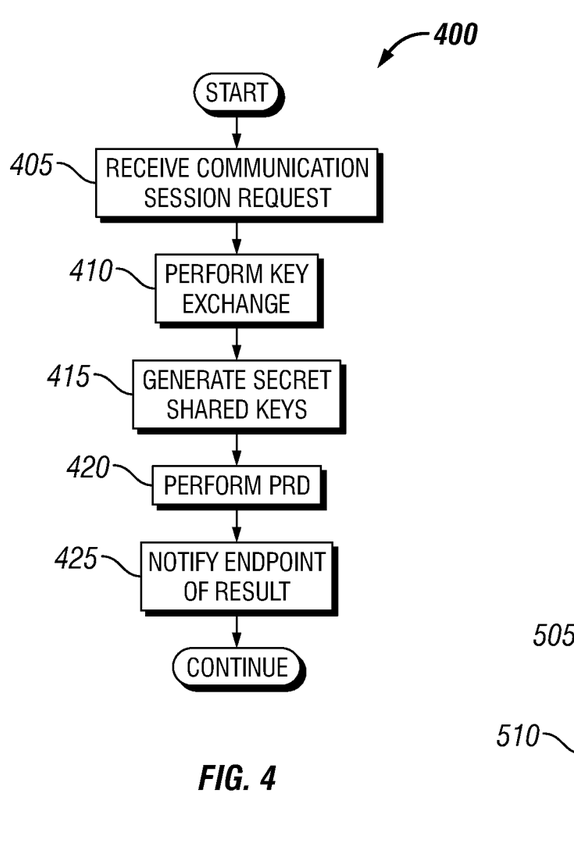
FIG. 4 is a flow diagram illustrating a method for evaluating communication path topology according to an embodiment of the present invention.

A method according to the present invention will now be explained. FIG. 4 is a flow diagram illustrating a method 400 for evaluating communication path topology according to an embodiment of the present invention. The purpose of this evaluation is to provide at least some level, if not complete assurance that a man-in the-middle or other false-location attack is not being attempted. That is, it is not required that a complete communication path topology be generated. In this embodiment, the authenticity of the messages between the nodes is also confirmed through the use of a shared secret key $K_S$. Note that as used herein, a "legitimacy determination" will be understood to mean evaluating both location and authenticity.

At START, it is presumed that the components necessary for performing method 400, such as those components described above with respect to FIG. 3, are available and operational.

The process then begins when a first endpoint receives a request (step 405) to establish a communication session with a second endpoint. The request will indicate a prefix associated with the second endpoint. The second endpoint may be a client, for example, and the first endpoint a server; where each endpoint communicates with the network via its respective access router. The invention is not limited to this exemplary configuration, however. The roles of these two endpoints may be reversed, for example, or they may be peer devices. The exact nature of the endpoints, in other words, is not important unless explicitly recited in a particular embodiment. In either case, the endpoints may be fixed or mobile, and may be telephones, computers, personal digital assistants (PDAs), or any number of other devices. By the same token, the access-router functions may be performed by any access device arranged to perform them. A key exchange protocol is then performed (step 410), including an ART (address reachability test). The key exchange may proceed according to an IKEv2 protocol, or HIP (host identity protocol), or some other key exchange scheme. At the end of the key exchange (assuming it is successful) each end node generates (step 415) a shared secret key $K_S$.

A PRD protocol is then performed (step 420) in order to confirm that the purported second endpoint is in fact topologically behind the second access router. This includes sending an authentication challenge to the second endpoint via the second access router, and receiving a reply indicating whether the second access router has determined that the second endpoint is behind the second access router. Each message is preferably authenticated by the recipient, and a digital signature checked.

Upon receiving the reply, the first access router notifies (step 425) the first endpoint of the result of the PRD. If the result indicates that the second endpoint is in fact behind the second access router, then the communication session may proceed as requested. In some embodiments, the PRD (step 420) may be repeated at one or more points during the communication session to confirm the initial topology evaluation and to ensure that it has not been changed. In this manner, the first endpoint is given a higher level of assurance that a false-location attack is not being attempted. If for any reason it is not possible to provide this assurance, for example if the purported second endpoint is determined to be topologically in front of the second access router, then the requested communication session may be denied, or some other action may be attempted (step not shown). Once the communication session has begun, if at any time appears that the topology related to the second endpoint is now questionable, the ongoing communication session may be terminated (step not shown).

Figure 5:
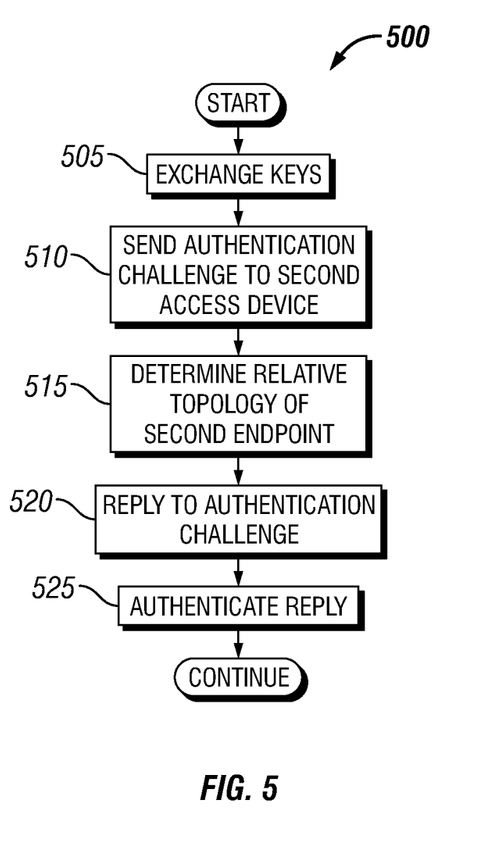
FIG. 5 is a flow diagram illustrating a method for evaluating communication path topology according to another embodiment of the present invention.

In another embodiment, the access routers (or similar devices) are arranged to handle the communication session establishment themselves. This may be referred to as proxy mode. FIG. 5 is a flow diagram illustrating a method 500 of evaluating communication path topology according to an embodiment of the present invention. That is, FIG. 5 illustrates one manner of operation in proxy mode. The access devices, of course, are examining the path topology in advance of or during a communication session between endpoints that they are respectively coupled with to provide network access. At START, it is presumed that the components necessary for performing a method according to the present invention are both available and operational. It is also presumed that an event, such as the arrival of a certain type of message, has triggered initiation of the procedure.

The method of FIG. 5 then begins at step 505, where a first access device and a second access device exchange keys according to a key exchange protocol. As part of this step each device generates a shared secret key relevant to the exchange. Either following the key exchange, or in parallel to it, the first access device sends (step 510) a location-authentication challenge to a second access device. Note that the location-authentication challenge, unless a specific format is specified in a particular embodiment, may take any form that is recognizable to the second access device and causes it (assuming it is able) to continue the procedure. In another embodiment (not shown), the second access device may in some circumstances initiate the process on its own, without receiving a location-authentication challenge from the first access device, for example on detecting that a secure key exchange is occurring. The second access device, responsive to receipt of the location-authentication challenge, determines (step 515) the topological location of the second endpoint with respect to the second access device and the first access device. When this determination has been made, the second access device sends (step 520) a reply to the first access device to notify the first access device of the relative topological location of the second endpoint.

Note that this notification does not have to provide a great deal of detail concerning the second endpoint. Rather, the purpose is to indicate whether the second endpoint is behind the second access device with respect to the first access device. "Behind", in this sense, means that the second access device is not situated on a path between the second access device and the first access device. When the first access device received the reply from the second access device, the first access device proceeds to authenticate (step 525) the reply. The process then continues, generally by permitting data communication between the endpoints.

Note that the illustrated method of FIG. 5 is conducted from the perspective of one of the two access devices. As should be apparent from this disclosure, the first and second access devices may reverse roles in the process, and may each send a location-authentication challenge to each other. That is, the PRD protocol may operate in either one, or in both directions either sequentially or at more or less the same time. This "two directional" PRD protocol may of course be performed in most embodiments of the invention regardless of whether the endpoints are peers or a client and a server, or whether the method is performed in proxy mode. In addition, either or both access devices (or endpoints) may initiate a repetition of the process at any time during the established communication session.

Figure 6:
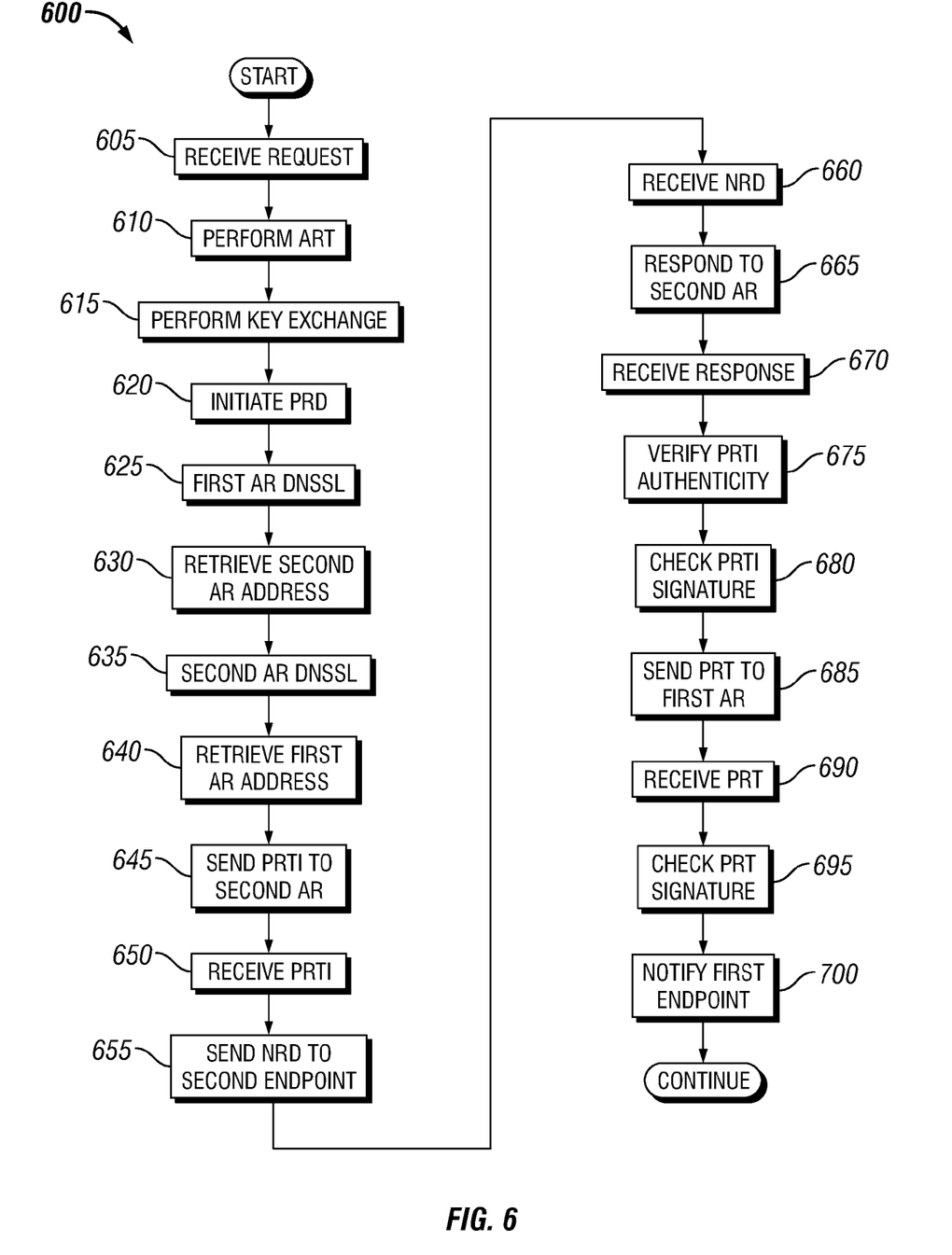
FIG. 6 is a flow diagram illustrating a method for evaluating communication path topology according to another embodiment of the present invention.

FIG. 6 is a flow diagram illustrating a method 600 for evaluating communication path topology according to another embodiment of the present invention. This evaluation is prelude to establishing a communication session. At START, it is presumed that the network components necessary to the execution of the method are in place and operational. The process then begins at step 605, where a first endpoint, for example a server, receives a request to initiate a communication session. The request purports to come from a second endpoint via a second access router. Naturally, the first endpoint will wish to confirm that the request does in fact come from the second end point, and not, for example, from an intermediate host engaging in a man-in-the-middle or other false-location attack.

According to this embodiment of the present invention, the process continues with the first endpoint initiating an ART (address reachability test) (step 610) in order to determine whether a communication session with the (purported) second endpoint is possible. If the ART is successful, a secure key exchange is conducted (step 615) to assist in testing the legitimacy of the purported second endpoint. One such key exchange, for example, is an IKEv2 (Internet key exchange, version 2); this is a well-known security protocol and therefore will not be described here in any detail. A HIP (host identity protocol) test may also be used at his step 615.

A PRD protocol according to the present invention is then performed, as will now be explained. Note, however, that the sequence shown in FIG. 6 is not exclusive; the PRD according to the present invention may alternately be performed in parallel, or partially in parallel, with the key exchange or analogous procedure (step 615). In yet other embodiments, the PRD may also or instead be performed at a later time, or repeatedly at intervals throughout the session.

In a PRD, the first endpoint delegates certain security functions to a first access router, the access router through which the first endpoint is communicating. In this embodiment, then, the first access router initiates the PRD (step 620). The first access router may be prompted in a number of ways to do this, but in this embodiment, the first access router automatically triggers the PRD when a key exchange message directed to or from the first endpoint is detected (step not specifically shown). In another embodiment (also not shown), the PRD is initiated when the first access router receives an explicit request from the first endpoint. The explicit request must contain, of course, an identification of the node to be verified, such as an IP address. Usually, the explicit message, if utilized, will also include a hash of the computed secret key shared by the first endpoint and the second endpoint.

The first access router then triggers a special DNSSL (DNSSEC (domain name system security extension) lookup) (step 625). This DNSSL is similar to a standard DNS query, but it is protected with a signature as defined in the DNSSEC protocols suite. In this embodiment, the special DNSSL consists of querying the DNS (or other secure database) regarding the address of the access router advertising a particular prefix. The DNSSL query includes only this prefix. In response, the first access router retrieves (step 630) the address of the second access router and its corresponding public key. In this embodiment, the addresses are IPv6 (Internet protocol version 6) addresses having a 64 bit prefix, and the public key is correspondingly a CGA (cryptographically generated address) key. In alternate embodiments, other protocols consistent with the method of the invention may be used as well.

Likewise, the second access router, which provides network access for the second endpoint, sends a DSSNL query (step 635) and retrieves (step 640) the address and public key of the first access router. Note that in some cases, a specific link may have multiple routers; in this event, only the access router advertising the prefix of the second endpoint participates in the PRD process.

In the embodiment of FIG. 6, the first access router then sends (step 645) a Prefix Request Test Initialization (PRTI) message directed to the second access router. This PRTI message contains 64-bit IP interface identifiers (IIDs) for both the first and second endpoints, and is authenticated with the hash of the shared secret key $K_S$ and signed with the private key of the first access router.

The second access router receives (step 650) the PRTI message, and then initiates a Neighbor Reachability Discovery (NRD) for the IP address obtained by concatenating the prefix associated with the second endpoint (and advertised by the second access router) and the IID of the first endpoint. This NRD message, which should be signed and authenticated, for example by using a SEND (secure neighbor discovery) protocol, is then sent (step 655) to the second endpoint. The second endpoint receives (step 660) the NRD message and, assuming it is a legitimate node, responds (step 665) by sending the appropriate response. The appropriate response, in this embodiment, should be signed or authenticated and include a hash of the shared secret key $K_S$.

The second access router then receives (step 670) the NRD message from the second endpoint, then verifies (step 675) the authenticity of the previously-received PRTI message from the first access router and checks its signature (step 680) using the first access router's public key. If the PRTI message is valid, then the second access router sends (step 685) to the first access router a reply in a Prefix Reachability Test (PRT) message. The PRT message is authenticated with a hash of the shared secret key $K_S$, and signed with the second access router's private key.

If, on the other hand, the second access router does not receive an appropriate NRD message from the second endpoint, that is, if the second endpoint does not show its presence on the specified link, the second access router sets a bit (step not shown) in the PRT message notifying the first access router that purported second endpoint appears to be an illegitimate node. The first access router receives (step 690) the PRT message and checks (step 695) its signature using the second access router's public key. The first access router then generates and sends (step 700) the appropriate message to the first endpoint, providing it with notification of whether the purported second endpoint is legitimate.

Note that the sequence of steps shown in FIG. 6 and described above is only one embodiment of the present invention, and in other embodiments some additional steps may be added or deleted. The steps themselves may be performed in any logically-consistent order. Note also that while each of the messages included in a particular PRD protocol preferable include $K_S$, or a hash derived using $K_S$, so that the recipient may use the shared secret key $K_S$ to test the authenticity of the message. In some embodiments, however, $K_S$ is used to check less than all of the messages in the PRD, and it may not be used at all. This is not preferred, however, because when used together, the $K_S$ helps to assure the identity and authenticity of the message, while the PRD protocol helps to assure that the endpoints (or, if applicable, other nodes) are in their proper or purported topological location. Finally, note that when a shared secret key $K_S$ is used, its generation or use may for convenience be referred to simply as a part of the particular PRD protocol under discussion.

In the mobile communication context, the second endpoint may be a mobile node. In this case, it is preferable that the PRD procedure be repeated periodically, especially after a binding update message has been sent the first endpoint.

Figure 7:
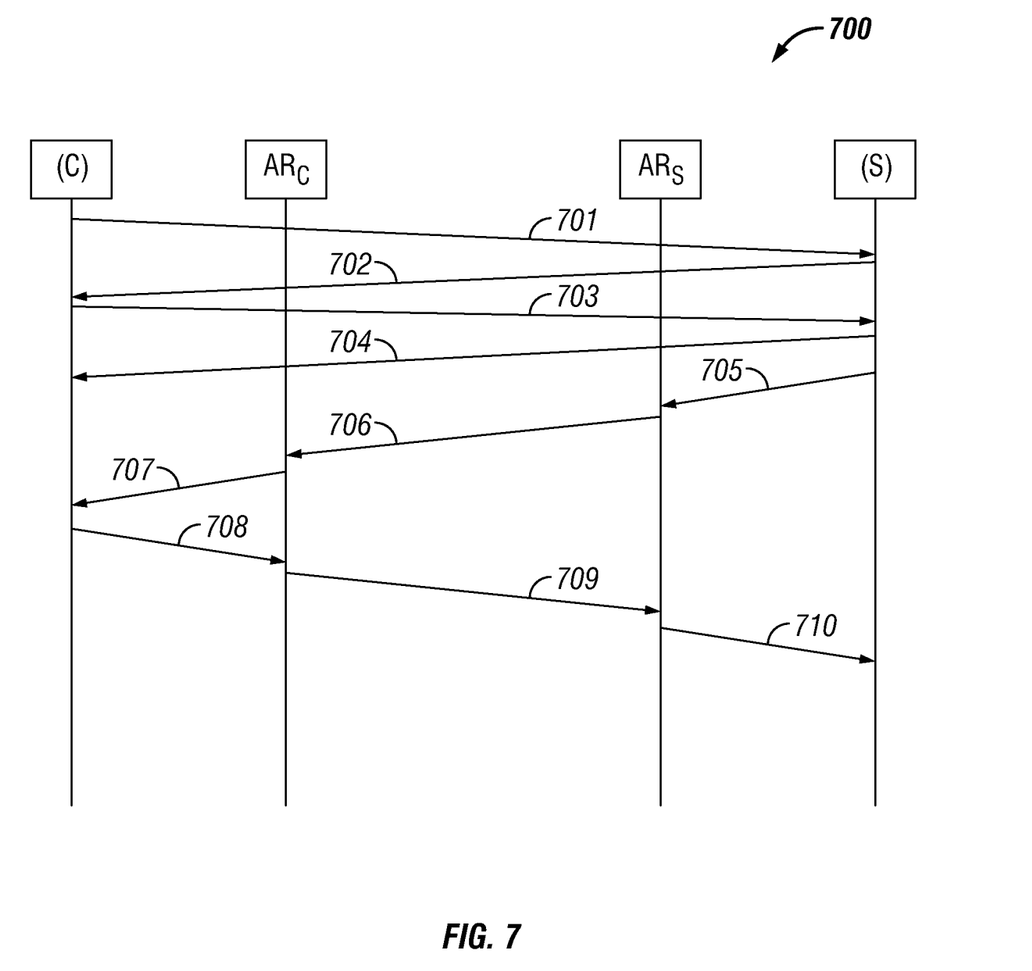
FIG. 7 is a message flow diagram illustrating a sequence of messages that may be used in a method for evaluating communication path topology according to an embodiment of the present invention.

In one embodiment, the first endpoint is a server (S) and the second endpoint is a client (C). FIG. 7 is a message flow diagram 700 illustrating a topology evaluation according to a client-server embodiment of the invention. In FIG. 7, the client (C) uses an access router $AR_C$ and the server (S) an access router $AR_S$. In FIG. 7, client (C) is a legitimate client, but initially of course this is not known to the server (S). Client (C) initiates contact and, in messages 701 through 704, the client (C) and server (S) conduct an IKEv2 secure key exchange. This includes an ART and, as mentioned above, at the conclusion of the IKEv2 (or other suitable) key exchange the endpoints, in FIG. 7 client (C) and server (S), are able to generate a shared secret key $K_S$. Again, this procedure is known and so will not be described here in further detail. Note that in another embodiment (not shown), $AR_S$ and $AR_C$ themselves conduct the secure key exchange as proxies for client (C) and server (S).

Referring to the embodiment of FIG. 7, message 705 initiates the PRD procedure. In message 705, server (S) sends to access router $AR_S$ an NDP (neighbor discovery protocol) message, which, in this embodiment, is a Router Foreign Prefix Detection (RFPD) message. The RFPD message includes the client (C)'s 64-bit network prefix $P_C$ (obtained in the IKEv2 exchange) and a hash of the shared secret key $K_S$. The access router $AR_S$ then performs a DNSSL (not shown in FIG. 7) and obtains the IP address and public key $K_{PC}$ for the access router $AR_C$.

Note that although message 705 is shown in FIG. 7 to follow messages 701 through 704, as mentioned above the PRD may also be performed, or at least initiated, in parallel with the IKEv2 exchange. In a presently preferred embodiment, however, the PRD is initiated after the ART has been successfully concluded.

The access router $AR_S$ then sends message 706 to the $AR_C$. Message 706 is a PRTI, and is sent to request an NRD regarding client (C). The $AR_C$ can confirm that the PRT message was sent from $AR_S$ by using a DNSSL to retrieve its public key $K_{PS}$ and using $K_{PS}$ to check the signature in the PRTI message. The $AR_C$ then sends an NDP message, message 707, to client (C). Message 7 is actually sent to all hosts attached to the link where the client (C) prefix $P_C$ is advertised. Upon receiving the NDP message 707, the client (C) sends its own NDP message 708 to the $AR_C$. Message 708 includes a hash of the shared secret key $K_S$. When the $AR_C$ receives the NDP message 8, it sends a PRT message 9 to access router $AR_S$. The PRT message 709 notifies access router $AR_S$ that the client (C) is legitimate. If this were not the case, the access router $AR_C$ would send a modified PRT message (not shown), indicating that client (C) is not legitimate.

Once it knows whether client (C) is legitimate, access router $AR_S$ sends an NDP message 710, which in this embodiment is a Router Foreign Prefix Text (RFPT) message, and notifies the server (S) of the result of the PRD procedure.

In the manner described above, in reference to various preferred embodiments, the present invention provides a way to evaluate communication path topology to avoid a false-location type of attach, such as a man-in-the-middle attack. If each endpoint can be confirmed to be behind its respective access device, then it is not a man-in-the-middle or "beside" the access device. A shared secret key KS may also be generated and used to confirm the authenticity of messages, either prior to or at the same time as the PRD, providing some additional assurance of legitimacy. It should be noted, however, that the features of each embodiment of the invention, as recited in the claims, does not include a requirement that success in this regard must be assured, or that in some cases an attacker may not be able to evade the protection provided.

Although the present invention has been described in detail, those skilled in the art should understand that they can make various changes, substitutions and alterations herein without departing from the spirit and scope of the invention in its broadest form.

The invention claimed is:

1. A method in a first access router in a packet-switched communication network for determining that a first endpoint originating a communication session with a second endpoint is not initiating a malicious man-in-the-middle attack, wherein the first access router provides access for the first endpoint to the network and a second access router provides access for the second endpoint to the network, wherein the first and second endpoints are either fixed or mobile endpoints, and communicate utilizing a communication protocol supporting fixed and mobile endpoints, wherein after the first and second endpoints conduct a secure key exchange, the method comprises:

utilizing a Prefix Reachability Detection (PRD) protocol to determine the first endpoint is topologically legitimate due to being topologically located behind the first access router and thus not located between the first access router and the second access router, wherein the step of utilizing the PRD protocol includes:
  receiving by the first access router, a Prefix Request Test Initialization (PRTI) message from the second access router requesting a Neighbor Reachability Discovery (NRD) for the first endpoint;
  verifying by the first access router that the PRTI message was sent by the second access router;
  upon verifying that the PRTI message was sent by the second access router, sending a NRD message from the first access router to one or more endpoints topologically located behind the first access router;
  receiving by the first access router, a response from the first endpoint that includes a hash of a shared secret key, wherein receipt of the response proves the first endpoint is topologically located behind the first access router, and the hash of the shared secret key identifies the first endpoint;
  determining whether the hash of the shared secret key received from the first endpoint is correct; and
  determining by the first access router that the first endpoint is topologically legitimate when the hash of the shared secret key received from the first endpoint is correct; and
sending from the first access router to the second access router, a PRTI message response indicating the first endpoint is topologically legitimate, wherein the PRTI message includes a signature of the second access router, and the step of verifying that the PRTI message was sent by the second access router includes retrieving a public key of the second access router and utilizing the public key to check the signature of the second access router.

2. The method according to claim 1, wherein the secure key exchange is either an Internet Key Exchange version 2 (IKEv2) key exchange or an Host Identity Protocol (HIP) key exchange.

3. The method according to claim 1, wherein the secure key exchange includes performing an address reachability test (ART).

4. An arrangement in a packet-switched communication network for determining that a first endpoint originating a communication session with a second endpoint is not initiating a malicious man-in-the-middle attack, the first and second endpoints are either fixed or mobile endpoints, and communicate utilizing a communication protocol supporting fixed and mobile endpoints, the arrangement comprising:
  a first access router configured to provide access for the first endpoint to the network; and
  a second access router configured to provide access for the second endpoint to the network;
  wherein the first and second access routers are configured to facilitate conducting a secure key exchange between the first and second endpoints, wherein a shared secret key is generated;
  wherein the first access router is configured to utilize a Prefix Reachability Detection (PRD) protocol to determine the first endpoint is topologically legitimate due to being topologically located behind the first access router and thus not located between the first access router and the second access router, wherein the first access router is further configured to:
    receive a Prefix Request Test Initialization (PRTI) message from the second access router requesting a Neighbor Reachability Discovery (NRD) for the first endpoint;
    verify that the PRTI message was sent by the second access router;
    upon verifying that the PRTI message was sent by the second access router, send a NRD message to one or more endpoints topologically located behind the first access router;
    receive a response from the first endpoint that includes a hash of a shared secret key, wherein receipt of the response proves the first endpoint is topologically located behind the first access router, and the hash of the shared secret key identifies the first endpoint;
    determine whether the hash of the shared secret key received from the first endpoint is correct;
    determine that the first endpoint is topologically legitimate when the hash of the shared secret key received from the first endpoint is correct; and
    send to the second access router, a PRTI message response indicating the first endpoint is topologically legitimate, wherein the PRTI message includes a signature of the second access router, and the first access router is configured to verify that the PRTI message was sent by the second access router by retrieving a public key of the second access router and utilizing the public key to check the signature of the second access router.

5. The arrangement according to claim 4, wherein the secure key exchange is either an Internet Key Exchange version 2 (IKEv2) key exchange or an Host Identity Protocol (HIP) key exchange.

6. The arrangement according to claim 4, wherein the secure key exchange includes performing an address reachability test (ART).

7. A first access router in a packet-switched communication network configured to determine that a first endpoint originating a communication session with a second endpoint is not initiating a malicious man-in-the-middle attack, wherein the first access router provides access for the first endpoint to the network and a second access router provides access for the second endpoint to the network, wherein the first and second endpoints are either fixed or mobile endpoints, and communicate utilizing a communication protocol supporting fixed and mobile endpoints, wherein the first access router includes a processor coupled to a non-transitory memory, wherein when the processor executes computer program instructions stored in the memory, the processor causes the first access router to:
  facilitate a secure key exchange between the first and second endpoints; and
  utilize a Prefix Reachability Detection (PRD) protocol to determine the first endpoint is topologically legitimate due to being topologically located behind the first access router and thus not located between the first access router and the second access router, wherein the first access router is configured to:
    receive a Prefix Request Test Initialization (PRTI) message from the second access router requesting a Neighbor Reachability Discovery (NRD) for the first endpoint;
    verify that the PRTI message was sent by the second access router;
    upon verifying that the PRTI message was sent by the second access router, send a NRD message to one or more endpoints topologically located behind the first access router;
    receive a response from the first endpoint that includes a hash of a shared secret key, wherein receipt of the response proves the first endpoint is topologically located behind the first access router, and the hash of the shared secret key identifies the first endpoint;

determine whether the hash of the shared secret key received from the first endpoint is correct;

determine that the first endpoint is topologically legitimate when the hash of the shared secret key received from the first endpoint is correct; and send to the second access router, a PRTI message response indicating the first endpoint is topologically legitimate, wherein the PRTI message includes a signature of the second access router, and the first access router is configured to verify that the PRTI message was sent by the second access router by retrieving a public key of the second access router and utilizing the public key to check the signature of the second access router.

8. The first access router according to claim 7, wherein the secure key exchange is either an Internet Key Exchange version 2 (IKEv2) key exchange or an Host Identity Protocol (HIP) key exchange.

9. The first access router according to claim 7, wherein the secure key exchange includes performing an address reachability test (ART).

* * * * *